United States Patent
Waldherr

(10) Patent No.: US 8,225,583 B2
(45) Date of Patent: Jul. 24, 2012

(54) CLOSING APPARATUS FOR CLOSING PREFERABLY BAG-TYPE PACKAGING UNITS

(75) Inventor: Reinhard Waldherr, Vienna (AT)

(73) Assignee: Westwind Verpackungen GmbH, Zeltweg (AT)

(*) Notice: Subject to any disclaimer, the term of this patent is extended or adjusted under 35 U.S.C. 154(b) by 0 days.

(21) Appl. No.: 13/051,576

(22) Filed: Mar. 18, 2011

(65) Prior Publication Data

US 2011/0167763 A1 Jul. 14, 2011

Related U.S. Application Data

(63) Continuation of application No. PCT/AT2009/000357, filed on Sep. 16, 2009.

(30) Foreign Application Priority Data

Sep. 18, 2008 (AT) .............................. A 1454/2008

(51) Int. Cl.
*B65B 51/10* (2006.01)

(52) U.S. Cl. ............... 53/371.8; 53/374.8; 53/375.6; 53/376.8; 53/377.3; 53/477

(58) Field of Classification Search ............. 53/477, 53/481, 307.7, 371.3, 371.4, 371.8, 372.3, 53/373.7, 374.4, 374.8, 375.3, 375.4, 375.6, 53/375.8, 375.9, 376.2
See application file for complete search history.

(56) References Cited

U.S. PATENT DOCUMENTS

| | | | | |
|---|---|---|---|---|
| 2,137,505 A | * | 11/1938 | Osgood | 100/154 |
| 2,331,054 A | * | 10/1943 | Shively | 156/209 |
| 2,441,940 A | * | 5/1948 | Rohdin | 156/289 |
| 2,669,815 A | * | 2/1954 | Zinn, Jr. et al. | 53/479 |
| 3,231,449 A | | 1/1966 | Tomson | |
| 3,367,261 A | * | 2/1968 | Kimifumi | 100/310 |
| 3,378,430 A | * | 4/1968 | Tadashi | 156/556 |
| 3,468,731 A | * | 9/1969 | Obeda | 156/73.1 |
| 3,474,592 A | * | 10/1969 | Hessner | 53/511 |
| 3,624,836 A | | 11/1971 | Rohdin | |
| 4,080,241 A | * | 3/1978 | Grevich et al. | 156/498 |
| 4,202,721 A | * | 5/1980 | Roberts | 156/358 |
| 4,557,377 A | * | 12/1985 | Maloney | 206/219 |
| 4,582,555 A | * | 4/1986 | Bower | 156/290 |

(Continued)

FOREIGN PATENT DOCUMENTS

CH 380 364 7/1964

(Continued)

*Primary Examiner* — Hemant M Desai
(74) *Attorney, Agent, or Firm* — Muncy, Geissler, Olds & Lowe, PLLC

(57) ABSTRACT

A closing apparatus for closing preferably bag-type packaging units by compression, which units have regions of differing thickness along the package opening to be closed, such as square bottom bags for instance, in particular made of coated or uncoated paper, paperboard, plastic, film, and/or woven material, which packaging units have at least one suitable sealing surface that is integrated in or applied to the material for permanent bonding to a surface that is adjacent to or opposite and pressed against the material, wherein the closing apparatus has a pressing device with at least one pressure device and at least one counter-pressure device between which the packaging units can be compressed, preferably with the application of heat, in the region of their sealing surface(s). In order to achieve a uniformly durable closure, the pressure device and the counter-pressure device have zones of different pressure and/or different temperature along the package opening to be closed.

17 Claims, 13 Drawing Sheets

U.S. PATENT DOCUMENTS

| | | | |
|---|---|---|---|
| 4,630,429 A * | 12/1986 | Christine | 53/479 |
| 4,649,259 A | 3/1987 | Zurn | |
| 4,761,197 A | 8/1988 | Christine et al. | |
| 5,067,302 A * | 11/1991 | Boeckmann | 53/374.8 |
| 5,527,416 A * | 6/1996 | Traise | 156/290 |
| 5,611,267 A * | 3/1997 | Lauderbaugh | 100/38 |
| 5,632,712 A * | 5/1997 | Heinz | 493/142 |
| 5,971,613 A | 10/1999 | Bell | |
| 6,227,271 B1 * | 5/2001 | Pourmand et al. | 156/498 |
| 7,219,483 B2 * | 5/2007 | Adair et al. | 53/451 |
| 2002/0170272 A1 | 11/2002 | Cooper et al. | |
| 2003/0051441 A1 * | 3/2003 | Adair et al. | 53/451 |

FOREIGN PATENT DOCUMENTS

| | | |
|---|---|---|
| DE | 28 45 271 A1 | 4/1980 |
| DE | 31 36 936 A1 | 3/1983 |
| DE | 44 20 808 A1 | 12/1995 |
| DE | 202 16 532 U1 | 2/2003 |
| FR | 2 102 967 | 4/1972 |
| WO | WO 2007/065951 A1 | 6/2007 |

* cited by examiner

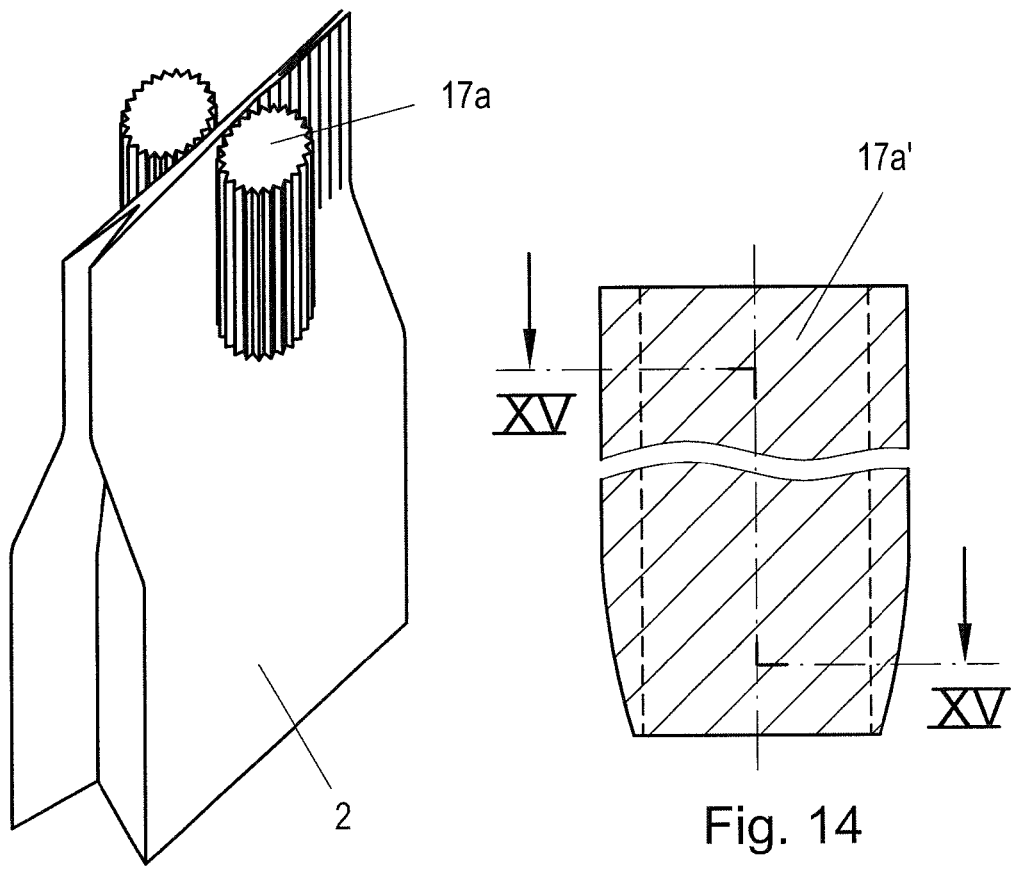
Fig. 13
Fig. 14
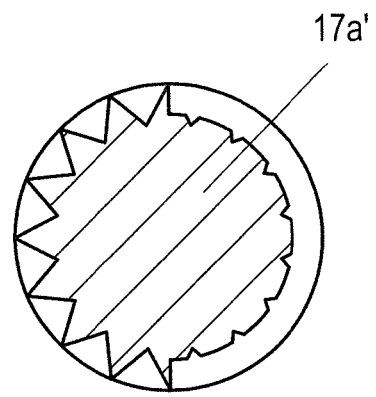
Fig. 15

CLOSING APPARATUS FOR CLOSING PREFERABLY BAG-TYPE PACKAGING UNITS

This nonprovisional application is a continuation of International Application No. PCT/AT2009/000357, which was filed on Sep. 16, 2009, and which claims priority to Austrian Patent Application No. A 1454/2008 18, which was filed in Austria on Sep. 18, 2008, and which are both herein incorporated by reference.

BACKGROUND OF THE INVENTION

1. Field of the Invention

The invention relates to a closing apparatus for closing bag-type packaging units by compression, which units have regions of differing thickness along the package opening to be closed, such as square bottom bags for instance, in particular made of coated or uncoated paper, paperboard, plastic, film, and/or woven material, which packaging units have at least one suitable sealing surface that is integrated in or applied to the material for permanent bonding to a surface that is adjacent to or opposite and pressed against the material, wherein the closing apparatus has a pressing device with at least one pressure device and at least one counter-pressure device between which the packaging units can be compressed, with the application of heat as required, in the region of their sealing surfaces, wherein the pressure device and counter-pressure device have zones of different pressure and/or different temperature along the package opening to be closed.

2. Description of the Background Art

In the field of the packaging industry, automated processing lines are employed to fill and subsequently seal various packaging units, wherein the packaging units are either supplied to the processing line as prefabricated empty containers, or the packaging material is supplied to the processing line as raw material (for instance, as sheets of paper or paperboard, or as film wound on a roll) and the packaging units are fabricated immediately prior to filling, for instance by welding the rolled-up packaging material in the form of a bag or by folding and adhesive bonding the sheets.

Bulk materials place special demands on the packaging units and the packaging equipment, especially when they have to be packed in the form of a fine powder, as is frequently the case for, e.g., construction materials or other granular or powdered materials, for instance in the pet goods industry. Moreover, these materials have to be packed in very large quantities, with sacks made of (coated or uncoated) paper or paperboard, or (sometimes fiber-reinforced) plastic usually being used. Because of the large fill quantities and the resultant high weight, these sacks generally are subjected to high stresses, yet should not tear or break open too easily, even when handled roughly on construction sites.

Especially high strength can be achieved with square bottom bags; not only are these bags very sturdy, but they also can be stacked and palletized especially well in the filled state because of their squared-off shape. Furthermore, the folded and still-unfilled square bottom bags stack well, so that they generally are supplied in prefabricated form, and delivered to the packaging line in stacks, where they are then separated and unfolded, in which process they usually are removed from the stack by a suction device, opened, and placed on a conveyor, and transported by the conveyor to the individual processing stations. Generally speaking, these processing stations include: a filling assembly for placing the powdered material in the sacks; a vibrator assembly for preventing air pockets in the powder material; a folding device, which presses together the opening of the bags from both sides, in which process it is necessary to ensure that the side panels of the square bottom bags are correctly folded inward; a trimming device for trimming the upper edge of the bag; a sealing unit, which tightly seals the bag opening, for example by hot-melt adhesive bonding, folding, sewing, pressing, and/or adhesive bonding; and a palletizing device, which stacks the filled and completed sacks on pallets.

With many of the packaging and sealing systems currently in use, only a relatively low cycle rate can be achieved for the present area of application, roughly in the range of 10 to 20 packed bags per minute and packaging line, with developments in recent years having accelerated these processing speeds only to a minor and unsatisfactory degree. Significant potential for improvement can be anticipated, especially with the sealing units that typically are used.

In the case of square bottom bags, for instance, sealing surfaces are provided on the inside of the material layer of the bag in the region of the opening; usually these sealing surfaces have one or more layer(s) of a hot-melt adhesive. To seal them, the bags are pressed together at their sealing zone and heated, and are bonded together in this way. To this end, first the side panels of the previously filled bags are folded inward by a device, and then the top part of the bag is pressed together, for instance by converging guide rails. For the actual sealing process, the sealing region of the bag is then placed between a pressure plate and a counter-pressure plate, which are subsequently brought together in order to compress the bag opening between them. Depending on the material used for the sealing surface or for the bag, either the pressure alone may suffice to seal the bag opening by means of pressure welding, or the sealing zone is additionally heated by heating elements provided at the plates in order to achieve self-adhesion or to soften a hot-melt adhesive applied in the sealing region. In order to weld the sealing surfaces on the inside of the packaging together tightly, the pressure must be maintained for a sufficient length of time. In this context, the compression time is related to the material to be sealed, the pressure applied to the material, and the temperature applied. The minimum required compression time is critical to the cycle times that can be achieved with this method, and at the present time is typically in a range from 3 to 7 seconds, and is empirically determined for each production run with the predefined pressing force. After pressing, the plates are opened and the closed and sealed packaging unit is transported to the next processing station by a conveyor belt.

In most cases, the process parameters necessary for tight sealing of the bags, thus in particular the temperature, pressure, and pressing time, can only be determined empirically, as already noted. The primary reason for this is that the manufacturers oftentimes do not disclose specific material characteristic values for the sealing materials that they supply, such as hot-melt adhesives, and these characteristic values can sometimes differ from one manufacturing lot to the next. The packaging materials also vary with regard to their physical characteristics. As a result, it can be necessary to adjust the parameters of the sealing unit to new conditions, even though the same product from the same manufacturer (for example, ready-made square bottom bags) is still being processed. A systematic approach to making these adjustments is made more difficult by the fact that no sensors for measuring the actual pressure and the actual temperature in the sealing zone are generally provided as yet in the sealing equipment currently offered on the market.

Another problem arises in packaging units that have different material thicknesses across the sealing region. This is the case in square bottom bags, in particular, which have a four-fold material thickness on the edge due to the inwardly folded side panels, but have only a two-fold material thickness between the folded side panels. This can be the case in other packaging units as well, for instance because of handle reinforcements or carrying handles embedded in the sealing zone.

To remedy the aforementioned problem, DE 3136936 A1 discloses a device for applying transverse welded seams to thermoplastic tubular films having gussets folded inward at the longitudinal edges, wherein this welding device has sealing jaws that are subdivided in such a manner that it is possible to maintain a larger spacing between the pressing and welding jaws in the region of the inwardly folded gussets than in the center region between the inwardly folded gussets.

SUMMARY OF THE INVENTION

It is therefore an object of the present invention to create a closing apparatus for packaging units that is improved over the prior art with regard to process stability, processing speed, reliability, and the quality of the products processed with the sealing device. In particular, using the closing apparatus, square bottom bags and other packaging units that have different thicknesses over the course of the package opening should be able to be sealed evenly and reliably, wherein the adhesive bond should be fully capable of withstanding loads as soon as it exits the apparatus.

Without limiting the invention thereto, the packaging units may be made, for example, of paper, paperboard, plastic, film, and/or woven material, but various other known materials may also be used in combination in a packaging unit, such as laminates, co-extruded composites, materials coated with metal and/or plastic, etc. The term "layer" or "material layer" should also be understood to include materials that themselves are made up of multiple layers, whether of the same or different materials. In general, the use of the invention should not be limited to a certain type of packaging units, but instead should be able to be used in all packaging units in which the above-mentioned problems occur.

According to the invention these objects are attained by a closing apparatus, wherein a significant increase in the operating rate of the entire device is additionally also achieved by the cooler. Especially at relatively high process temperatures, the cooling device accelerates the curing of the seal.

Moreover, the closing apparatus can additionally have a punch for introducing a handle opening in the packaging unit. In this context, the handle opening can be introduced into the previously sealed region, preferably after cooling. The increased stability of the sealed region is used in this context, since the handle openings can support a higher carrying load there without tearing than is the case in the unsealed material.

In particular, when the cooling device has two cooling plates, which are pressed against the sealing region from both sides for cooling, the punch can be integrated in the cooling device in one embodiment of the invention. This permits especially compact construction, and shortens the processing line.

In another embodiment, the punch can have one or more cutting edges, at least one of which is discontinuous facing the top of the packaging unit. The handle opening punched out with this cutting edge folds back at the discontinuous location when gripped so that a doubled material thickness is present in the region that is gripped by the hand (grip region), increasing the stability of the grip region. This avoids cuts that may be inflicted at the sharp cut edges, since the fingers of the carrying hand grip the handle opening only at the folded location, and carrying comfort is improved by the improved pressure distribution since the grip does not press into the hand as sharply.

In another embodiment of the invention, the closing apparatus can have, located ahead of the pressing device, a device for trimming the top container edge, which is provided with a suction device if desired. The top edges of the packaging units are preferably trimmed after they have been folded together subsequent to filling and before they are delivered to the pressing device. The dust produced during trimming and the edge that has been cut off are drawn off by a suction device. This has the advantage that any dirt on the outside of the bag that could occur during filling is removed by suction, and not merely the material produced during cutting. Moreover, some of the air in the bag is likewise removed by this suction device, so that under certain circumstances the above-mentioned suction fitting for creating an underpressure can be omitted, since its function is performed by the trimming unit's suction device.

In another implementation according to the invention, a hot-melt adhesive can be applied to the sealing surfaces of the packaging units. Even though the inventive device can be used with a plurality of different sealing surfaces, hot-melt adhesive sealing surfaces offer good processing characteristics and permit a high sealing force.

In another embodiment of the invention, pressure and/or temperature sensors can advantageously be provided on the pressure device and/or the counter-pressure device. These sensors facilitate systematic acquisition and optimization of the system parameters during set-up and adjustment of the system, and are used for in-process quality control during ongoing operation.

Finally, another embodiment of the closing apparatus according to the invention provides that, at least in the region of the pressing device, the packaging units are held at the height of their sealing surfaces between conveyor belts that are passed between the pressure device and the counter-pressure device, wherein one or more induction coil(s) are provided in the region of the pressing device to heat the conveyor belt. Belt guidance not only ensures correct positioning of the processed packaging units (for instance, in the case of clock-controlled advance) but also provides for spatial separation of the packaging unit and the pressure or counter-pressure device, by which means the latter are protected from contamination that can arise when the packaging units are being filled with finely powdered or dust-producing bulk materials, wherein, in order to minimize heat loss, the induction coils may be placed either in the pressure or counter-pressure plates, so that the packaging units are heated at the same time as the pressing, but they may also be arranged either before or after the pressing device. When the pressing device is composed of one or more roller pairs, the induction coils may be provided before, between, or after the roller pairs. In all cases, the heat can be generated precisely where it is needed for the sealing process, namely directly at the packaging unit. As a result of a simple, intermittent cycling of the induction coils, it is furthermore possible to heat the conveyor belt only where a packaging unit is actually being held, and not in the free spaces between them.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 13 shows a schematic representation of a spring-mounted roller pair with corrugated circumferential surfaces for producing a profiled sealing surface;

FIG. 14 shows a cross-sectional view of an alternative embodiment of a roller;

FIG. 15 shows a cross-sectional view of the roller along the line XV-XV from FIG. 14;

DETAILED DESCRIPTION

Figure 1:
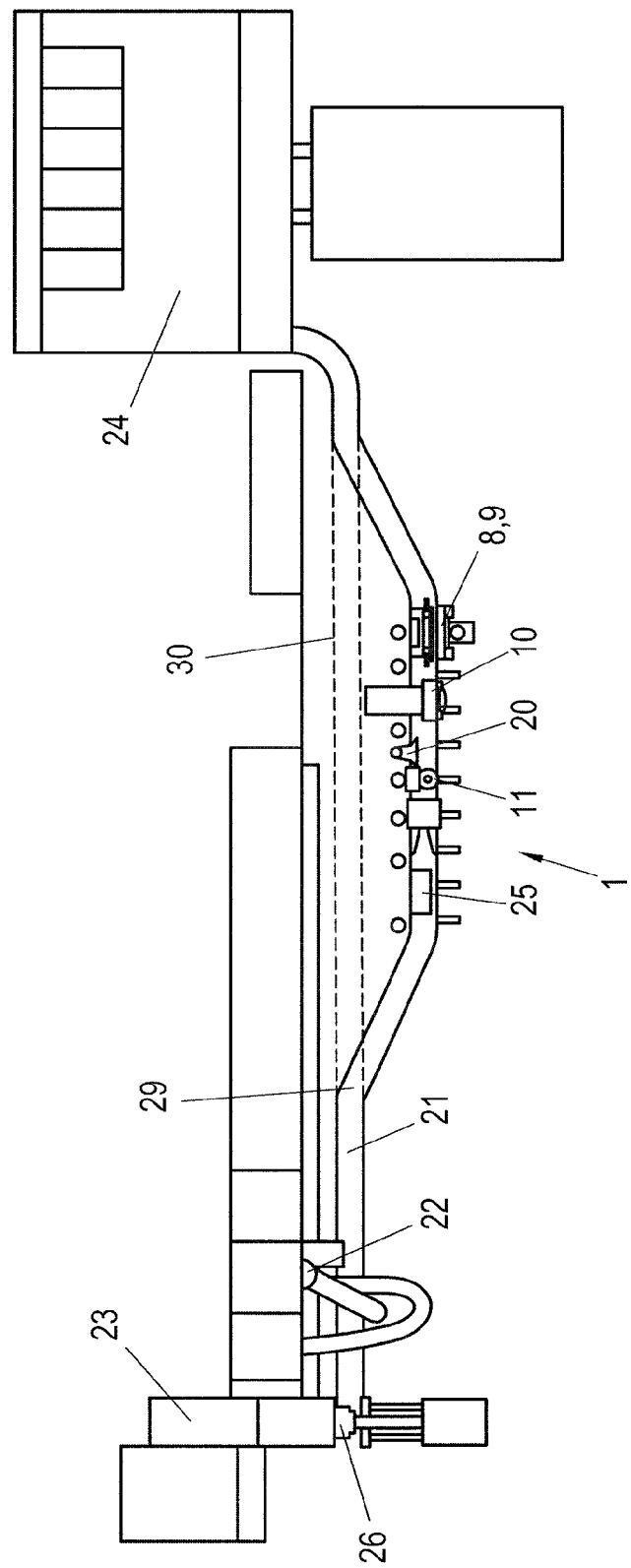
FIG. 1 shows a top view of a processing line in which a closing apparatus according to the invention is used.

FIG. 1 shows a top view of a processing line with the closing apparatus 1 according to the invention, wherein the individual processing stations are shown schematically. FIG. 1 is used to explain the individual processing steps that are necessary to fill, close, and palletize the packaging units 2, in particular square bottom bags, wherein the devices that embody the invention are shown in greater detail in the other figures.

The packaging units 2, in this case square bottom bags, are delivered to the system by a bag feeder 23, wherein the bags are either placed in the feeder by hand, or are supplied in magazines that are then exchanged as units when needed. The square bottom bags are folded and stacked, and are taken from the bag feeder 23, unfolded, and placed on a conveyor belt 21 by a removal and unfolding device 26. The conveyor belt 21 can transport the packaging units 2 in a continuous or cyclic manner, wherein a transition between continuous and cyclic conveyance can also be provided between the individual processing stations. The open bags are then delivered to a filling assembly 22, with the filling assembly 22 and the removal and unfolding device 26 being shown in greater detail in FIG. 3.

Figure 3:
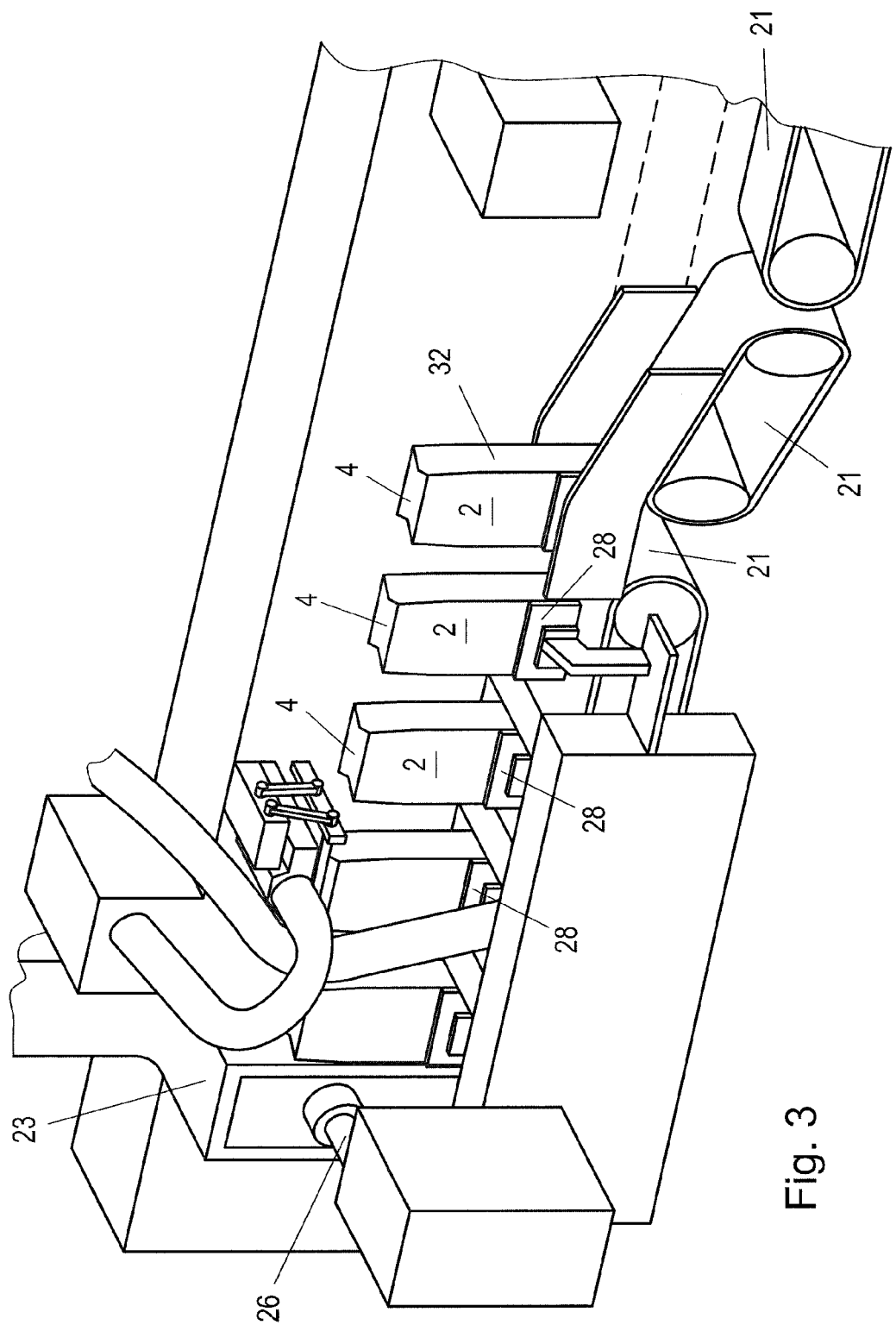
FIG. 3 shows a forward region of the processing line, from the bag feeder to the entrance to the sealing unit.

As is evident from FIG. 3, the conveyor 21 is provided in the region of the filling assembly 22 with support plates 28, which support the lower region of the sides of the packaging units 2. The support plates 28 are shown only schematically in FIG. 3, and are preferably moved with the packaging units, as can be understood readily by one skilled in the art. They primarily serve to increase the stability of the packaging units 2 during the filling process. The filling assembly 22 dispenses the appropriate quantity of the material to be filled into each packaging unit 2, during which process air bubbles can form in the bag, especially in the case of dust-producing, finely powdered materials. In order to prevent the formation of such air bubbles and to compress the material being packaged, the packaging units 2 can be shaken in the region of the filling assembly 22 or thereafter by vibrating the support plates 28, or by means of a vibrator device (not shown) located beneath the conveyor belt 21. Through the use of vibrator assemblies, this entrapped air usually can be removed during or after filling, although it is not possible to fill the packaging units completely (which is to say up to the bottom edge of the sealing surface), and a free space must always be left between the bulk material and the bottom edge of the sealing region. The filled packaging units 2 are subsequently transported to the other processing stations by the conveyor belt 21. In order to increase throughput, the filled packaging units can also be distributed among multiple processing lines through a switch 29 if desired, as is indicated by the alternative processing line 30 shown in dashed lines. Alternatively, even when alternative processing lines are present, all packaging units 2 can pass through the same processing line, so that the alternative processing line 30 is available for maintenance or conversion.

Provided in the upper region of the packaging units 2 in the bag interior are sealing surfaces 4, which can be sealed together by being pressed together, if applicable under the influence of heat. The sealing surfaces 4 can be composed of a layer of a hot-melt adhesive applied to the packaging material. Alternatively, the packaging material itself can be sealable by the action of heat and pressure. The sealing surface 4 can either be provided only in the upper region of the packaging—the sealing or closure region—or instead it can also extend over the entire surface of the packaging if this is advantageous from a manufacturing standpoint. Preferably, the sealing surface 4 is provided in the closure region on the inside of the packaging unit 2 and also on the outside of the packaging unit 2 in the region of the side panels 32. While the additional outer sealing surface on the side panel 32 is not necessary for sealing the package opening, it may still be desirable for aesthetic reasons or for reasons of stability of the finished package.

In order to tightly seal the packaging units 2 thereafter, they subsequently arrive, as is again evident in FIG. 1, at a folding device 25, a trimming device 11 equipped with a suction device, a sealing/pressing device 10, and a cooling device 8 equipped with a punch 9. This part of the processing line contains the essential improvements according to the invention and is shown only in overview in FIG. 1, since more detailed embodiments are described in depth below in connection with the other figures. Once the packaging units 2 have passed through this part of the processing line, they are sealed and provided with a punched handle opening 37, and finally are transported by the conveyor belt 21 to a palletizing device 24, where they are stacked on pallets using known technologies. Prior to palletizing, the top edge of the sealed packaging units may be processed once again, for instance by another trimming with a trimming blade 31, as is shown in FIG. 2.

The devices used for sealing of the packaging units 2 are shown in a front view in FIG. 2, and in FIG. 4 are shown again in a diagrammatic representation viewed at an angle from below. The packaging units that have already been filled first arrive at the folding device 25. This device ensures that the closure regions of all packaging units 2 arrive at the subsequent guide plates 27 in the correct orientation to be properly folded there. As is shown in FIG. 5 in detail, the folding device 25 has four bag spreaders 33 and two side plates 34. The folding device 25 with the bag spreaders 33 and the side plates 34 is lowered from above onto the filled packaging units 2 such that the four bag spreaders 33 are located in the interior of the packaging unit 2 and the side plates 34 are located outside of the packaging unit 2 next to the side panels 32. The bag spreaders 33 are then moved outward slightly in order to fix in place the corners of the opening of the packaging unit 2, while the side plates 34 press the panels 32 inward into the bag, so that the fold in the center of the panels projects into the interior of the bag in the upper region of the packaging unit. Thereafter, the folding device 25 is withdrawn upward out of the packaging unit 2 again. The packaging units 2 are then moved onward by the conveyor belt 21, wherein the closure region, which is now oriented for correct folding, arrives between two guide plates 27, between which the closure region with inwardly folded side panels 32 is brought together. In this process, the sealing surfaces 4 in the interior of the packaging unit 2, and if applicable the sealing surfaces provided on the side panels 32 on the outside of the packaging unit 2, are also brought to one another.

Figure 2:
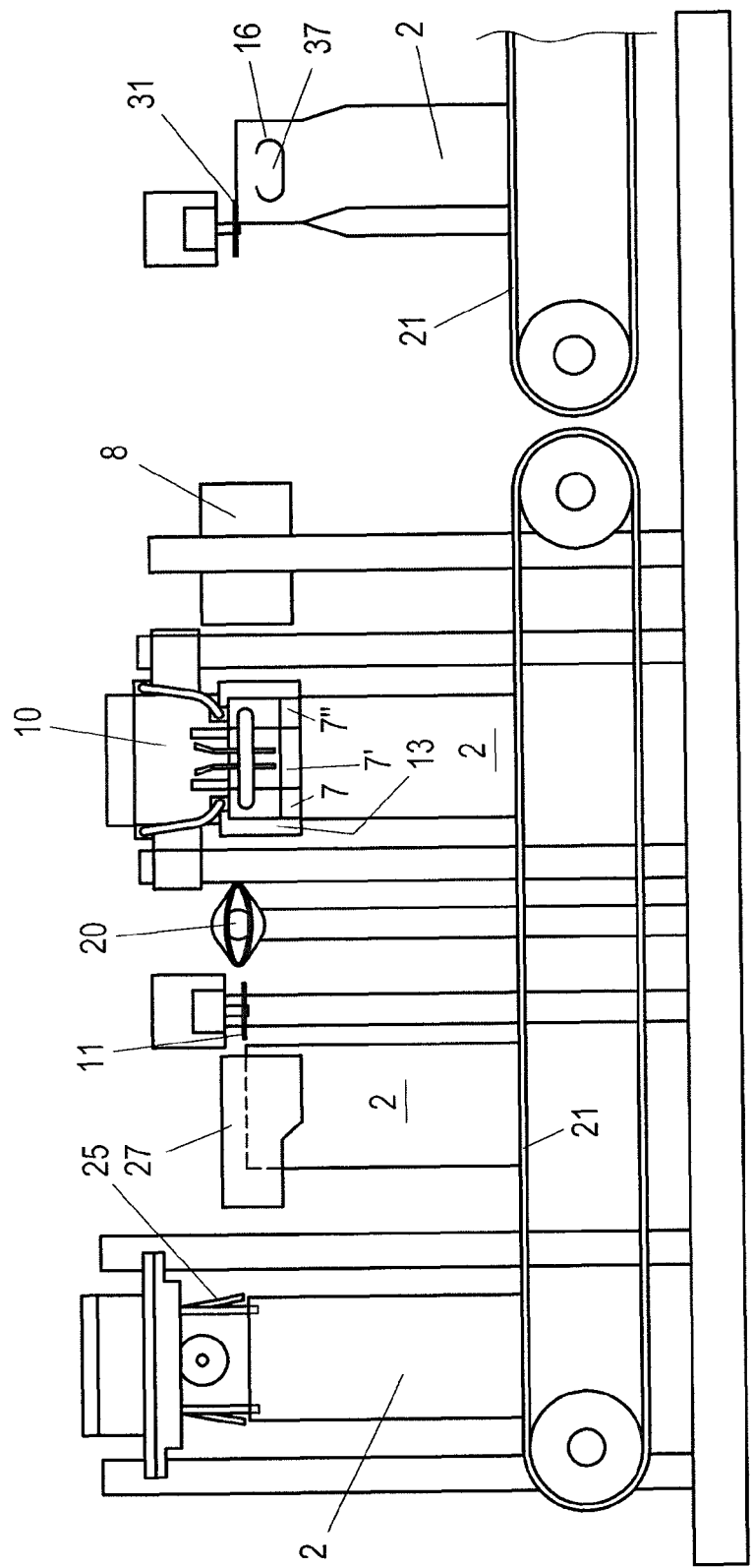
FIG. 2 shows a front view of the center region of the processing line with a folding device, a trimming device, and a sealing/pressing device.

As is evident from FIG. 2, a device 11 for trimming the top edge of the packaging unit 2 is provided immediately after the guide plates 27. The cut-off strip of material is drawn off by a suction device 20. The suction device 20 also serves to draw off residues of material adhering to the packaging from the filling process. In addition, material residues and dirt that have been deposited on the sealing surfaces 4 in the interior of the packaging unit 2 can also be removed by the suction device 20, thus improving the reliability of the seal. Because the nozzle of the suction device 20 is applied directly to the already closed but not yet sealed opening of the packaging unit 2, it is also possible to draw excess air out through the opening gap of the packaging unit 2 before the packaging unit 2 is sealed. After sealing, air remaining in the packaging after filling on account of the safety clearance between filled material and sealing region could have the result that such "inflated" packaging units 2 burst when being stacked. The suction device 20 thus provides for more compact containers, wherein the suction force is regulated such that the air remaining in the packaging unit 2 is drawn out by the nozzle, but not the filled material.

The actual sealing process is carried out by a pressure device 5 and a counter-pressure device 6, which compress the sealing region of the packaging unit, preferably under the application of heat, wherein the design of the pressure device 5 and counter-pressure device 6 represents the key aspect of the subject invention. In a preferred embodiment, the pressure device 5 and the counter-pressure device 6 are designed as a pressing device 10, which is described in detail below with reference to FIGS. 2, 4, and 6 through 9.

Figure 4:
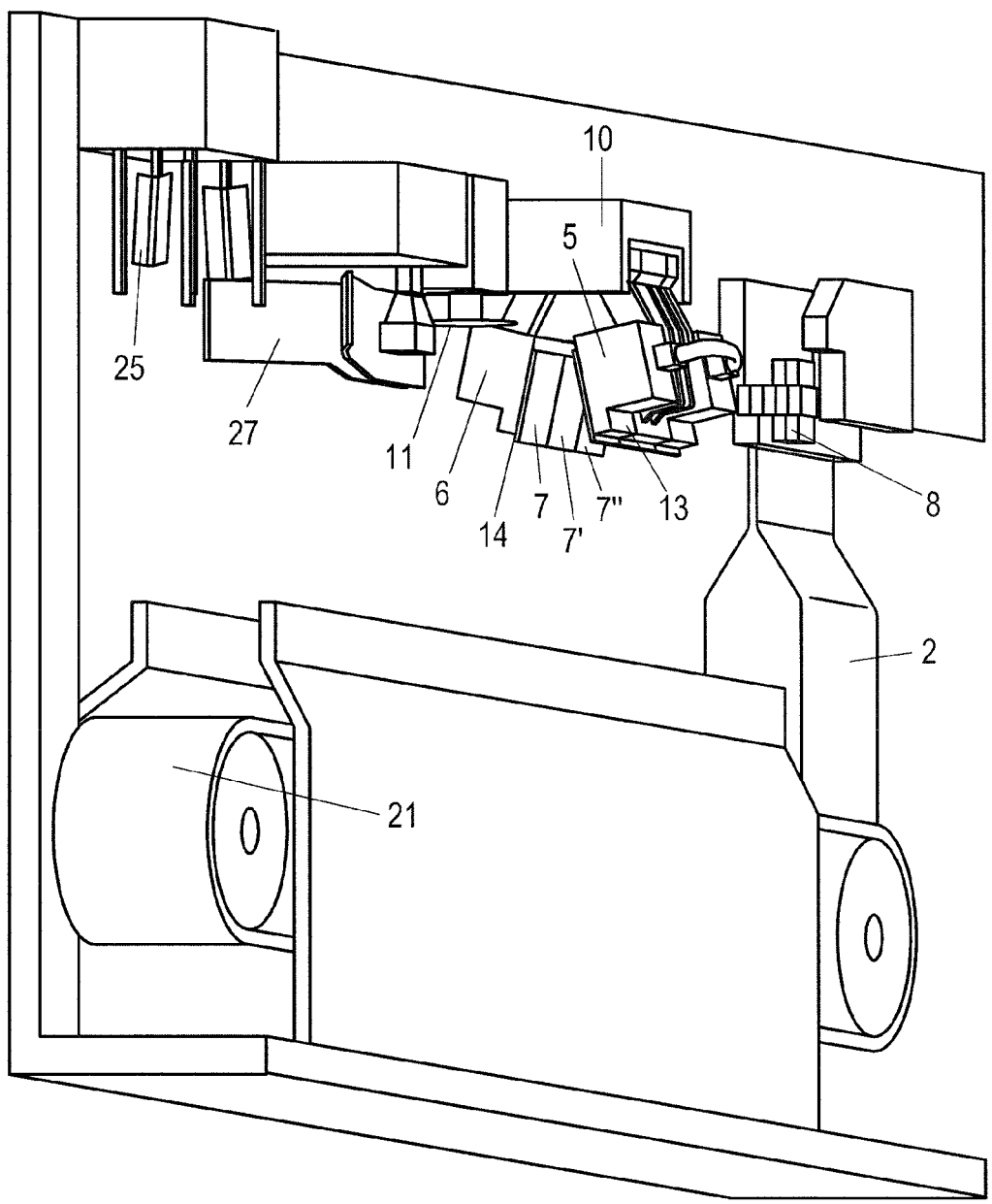
FIG. 4 shows a diagrammatic representation of the region of the processing line containing the sealing unit, viewed at an angle from below.
Figure 5:
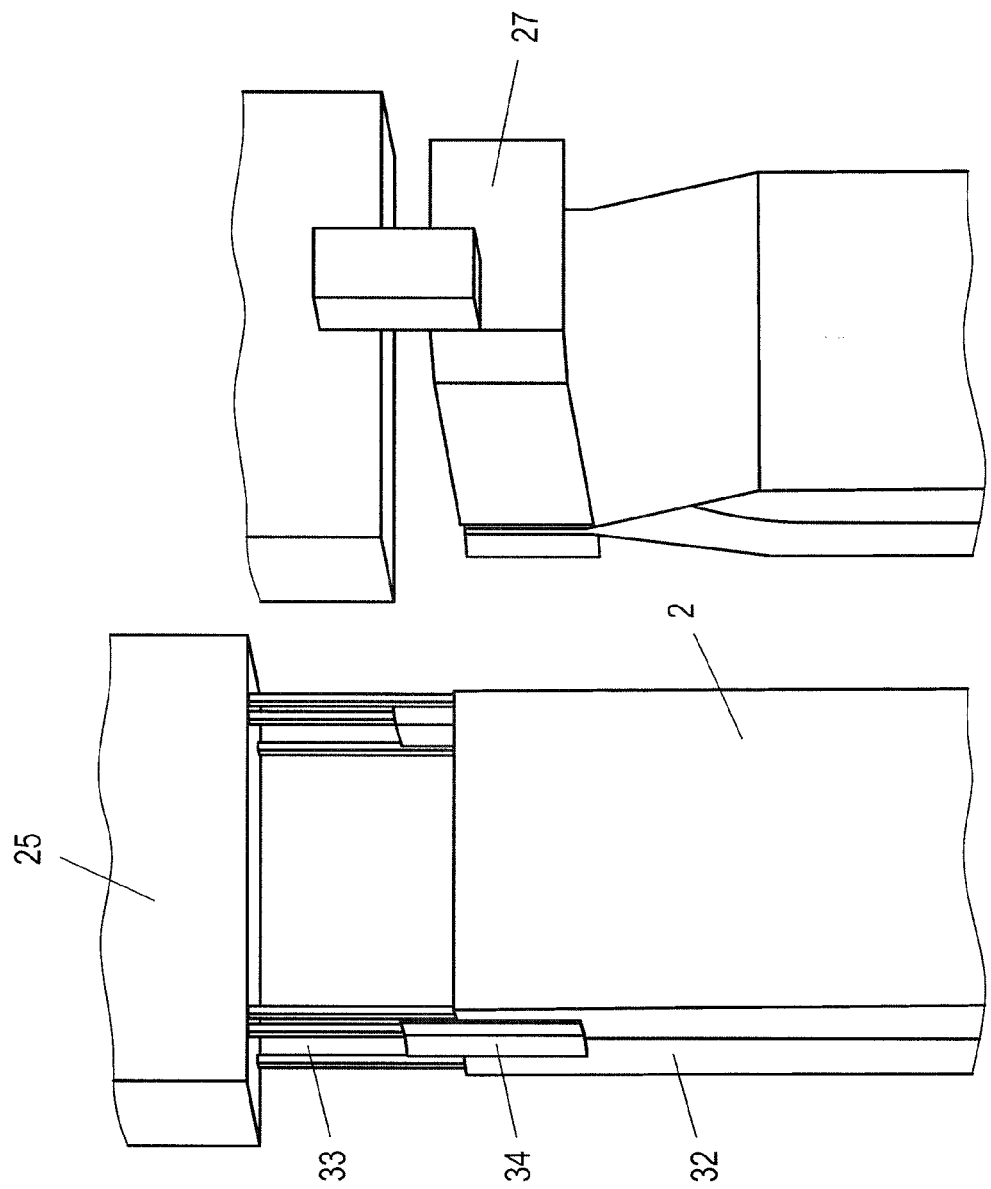
FIG. 5 shows a diagrammatic representation of a folding device for folding together the opening of filled packaging units.
Figure 7:
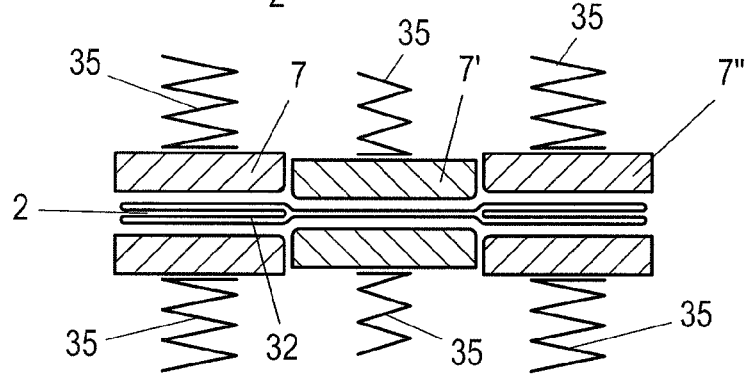
FIG. 7 shows a cross-sectional view along line VII-VII from FIG. 6 through the pressure plates of the pressing device, in which the spring mounting of the plates for the individual pressure zones is visible.
Figure 8:
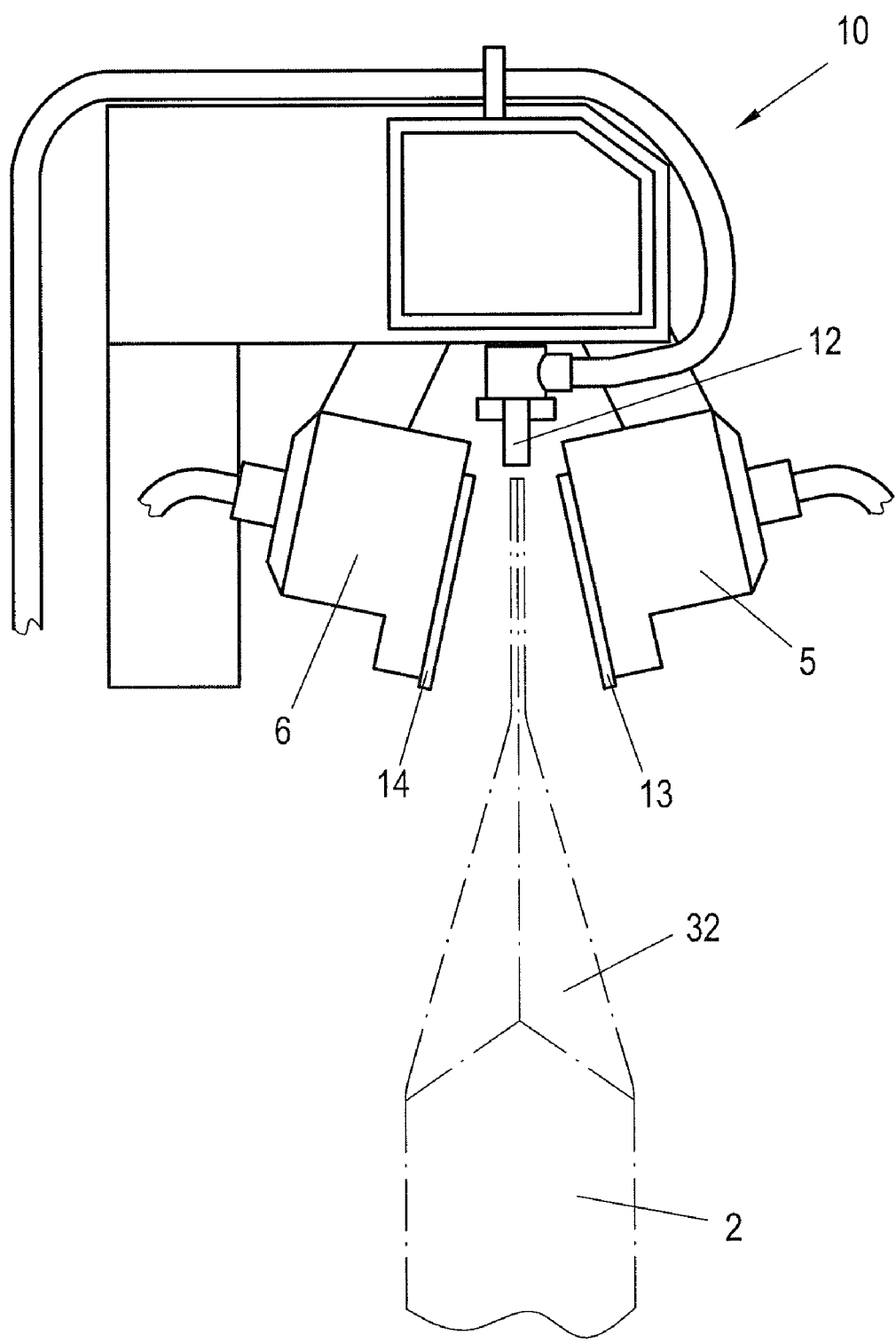
FIG. 8 shows the pressing device in an end elevation.

As is evident in particular from FIGS. 4 and 8, the pressing device 10—as is also the case in sealing devices known from the prior art—include a pincer-like device with a pressure plate 13 and a counter-pressure plate 14 between which the region to be sealed is compressed. Heating elements for heating the sealing surfaces 4 are provided in the plates 13, 14 (or in the pincer jaws located behind them). In contrast to conventional sealing units, in which the pressure and counter-pressure plates are designed as essentially flat, uniformly heated plates, both the pressure plate 13 and the counter-pressure plate 14 in the depicted sealing unit according to the invention have three pressure zones 7, 7', 7" each, the method of operation of which is explained with reference to FIGS. 6 and 7.

Figure 6:
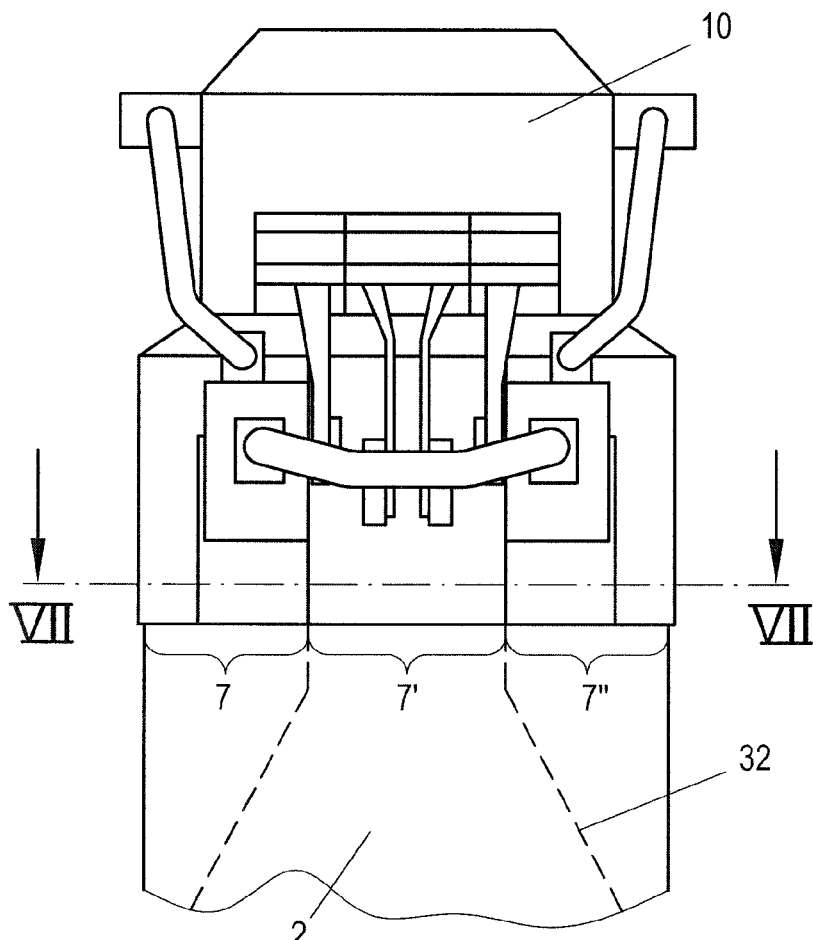
FIG. 6 shows a hot sealing/pressing device in a front view.

FIG. 6 shows a pressing device 10 according to the invention with a packaging unit 2 clamped between the pincer jaws of the pressing device 10 for sealing. As is clear from the above description, each packaging unit 2 has at least three regions of different thickness in the sealing region as a result of the inwardly folded side panels 32: at the sides, where the side panels 32 are folded inward between the two sides of the packaging unit 2, the packaging unit 2 has four layers, and in the center of the sealing region the packaging unit 2 has only two layers. This is clearly visible, for example, in the sealing region of the packaging unit 2 clamped between the pressure plate 13 and counter-pressure plate 14 shown in cross-section in FIG. 7. The pressing device 10 according to the invention takes this fact into account by means of three pressure zones 7, 7' and 7", whose pressure or temperature settings can be adjusted independently of one another. This embodiment is suitable both for a clock-controlled, automatic advance of the packaging units in processing lines, and for a manual feed in smaller layouts. The sealing process corresponds largely to the method used in the prior art, wherein the packaging unit is compressed between the pressure plate and counter-pressure plate, and heated if applicable. However, as a result of the fact that both the pressure and the temperature can be adjusted separately in the individual zones, the three different zones can be used for sealing regions of the packaging unit having different thicknesses. On the pressure and counter-pressure plates designed in three parts for sealing square bottom bags, the two side zones correspond to the four-layered side regions of the square bottom bag, while the zone between them corresponds to the two-layered region.

In conventional pressing devices, in which the packaging units are compressed between two flat plates, it is not possible to select the contact pressure and the temperature such that the optimal contact pressure is produced for each sealing surface 4 to be sealed, since the thicker edge regions (7, 7") are always compressed more than the center region (7). In addition, the thinner material layers heat more rapidly than the thicker layers. It has hitherto always been necessary to find a compromise for the adjustable parameters (pressure, temperature, compression time), wherein the compression time has usually been increased in the case of non-optimal settings, raising the throughput times.

In the pressing device shown in FIG. 7, the contact pressure in all pressure zones 7, 7', 7" is individually adjustable through separate adjustment springs 35 for the packaging unit 2 being processed, so that the correct parameters can be found and set for each region. In a preferred embodiment, the prevailing pressure and temperature conditions in the individual pressure zones 7, 7', 7" can be measured directly at the packaging unit by suitable sensors, so that a systematic method of procedure, which is based on the conditions actually present, is made possible in the empirical determination of the optimal settings using the recorded measurement values. The use of parameters that are measured with separate sensors rather than derived from the values that have been set makes it possible to compare the results achieved directly to measured values and settings that have been measured and recorded with machines of similar type.

The values measured in the individual pressure zones 7, 7', 7" make it possible for the first time to bring the process parameters into direct relationship with the applicable material characteristics. The material characteristics here are, in particular, the paper thickness, the number of paper layers in the applicable zone, the characteristics of the sealing material used (for example, a specific brand of hot-melt adhesive) and the number of sealing surfaces 4 to be sealed in the zone. Depending on whether [sealing surfaces are additionally provided on the outside of the side panels 32 (with the bag open), two or three pairs of surfaces to be sealed may be present in the two side pressure zones 7, 7", for example, even when the same number of paper layers is compressed in both cases. All of these parameters can be centrally collected and recorded by the manufacturer of the packaging units or sealing device 1, for instance, and can be made available in prepared form to the customers who use the devices according to the invention.

A systematic procedure of this nature makes it possible to use settings that already closely approach the optimal settings, even before the first test runs of newly set-up machines (or after changing the machine over for new packaging units). Not only does this shorten the lead times for production, it also reduces the quantity of rejects produced during adjustment of the system. Furthermore, the parameters for pressure and temperature that can be optimized individually in each of the pressure zones 7, 7', 7" make it possible to minimize the value of the third parameter, the pressing time. As a result, it is possible to reduce the cycle times and thus to increase the throughput.

Figure 7A:
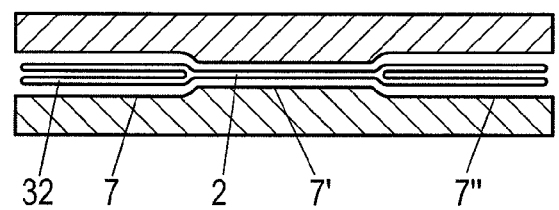
FIG. 7a shows a cross-sectional view along line VII-VII from FIG. 6 through another embodiment of the pressure plates of the pressing device, wherein the plates are made of an elastic material and have a profiled surface.

The embodiment shown in FIG. 7 with three-part, individually spring-mounted pressure and counter-pressure plates 13, 14 allows a very precise adjustment of the individual pressure zones 7, 7', 7", although in some cases it can be advantageous to implement the different pressure zones in a flexible pressure or counter-pressure plate, as is shown in FIG. 7a for instance. The contact pressure in this design is determined by the different material thickness of the elastic plate material in the individual zones. In conjunction with the different material thicknesses, a specific contact pressure that depends on the overall contact pressure is produced for each pressure zone 7, 7', 7". With this design, changing the system over to different packaging units could be accomplished simply by replacing the pressure plate 13 and counter-pressure plate 14. Thus, while this embodiment has fewer opportunities for adjustment than the multi-part embodiment from FIG. 7, in exchange it offers a wider variety of shapes so that the device can also be adapted to, e.g., different dimensions of the pressure zones 7, 7', 7", which can result from different widths of the side panels 32 for packaging units 2 of different thicknesses, for example. The transitions between the individual pressure zones 7, 7', 7" in this embodiment can also be provided with a gradual transition so as to avoid ridges being pressed into the material, which could lead to breaks in the material.

Although the press heads of the closing apparatuses according to the invention 1 are described herein with three pressure zones 7, 7', 7", the invention can also be used for packaging units 2 that have more than 3 different pressure zones. For instance, an additional pressure zone could be necessary if the packaging unit 2 has a seam so that a short section with four layers is present in the two-layered material region, for example. In addition, a material reinforcement for a carrying handle could be provided in the sealing region of the packaging units, which likewise results in a greater material thickness in a limited region. A similar effect can be achieved with the closing apparatus shown in FIG. 7a, whose pressure plate and counter-pressure plate are designed as flexible plates with different pressure zones. In this design, the different pressure zones are not formed by different spring elements, but instead by the elasticity of the plates themselves. The elastic plates have a surface that is continuous over the entire pressure region, thus avoiding fold lines in the packaging material that could result in the vicinity of the joints when subdivided pressure plates are used. This embodiment with the flexibly designed plates is especially well suited for more demanding shapes of this nature.

FIG. 8 shows, in an end elevation, a pressing device 10 with a schematically represented packaging unit 2 located beneath it. Shown above the packaging unit 2 is a suction fitting 12 connected to a suction device, through which air can be drawn out of the packaging unit immediately prior to sealing. The suction fitting 12 can be provided in addition to or as an alternative to the suction device 20 shown in FIG. 2.

Figure 9:
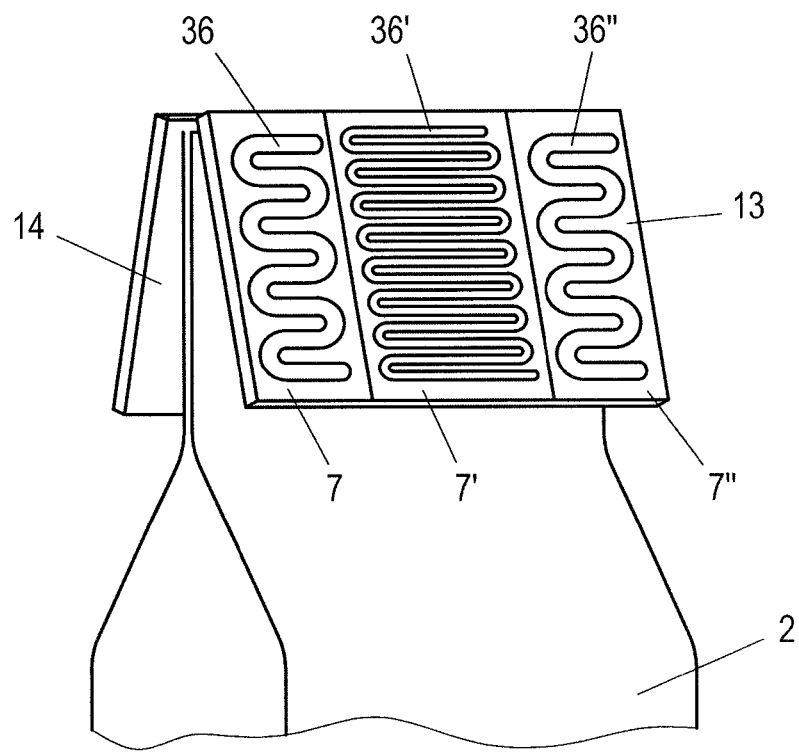
FIG. 9 shows a diagrammatic, schematic representation of the pressure plates of a pressing device, in which the different heating zones are visible.

FIG. 9 shows a schematic representation of the pressure 13 and counter-pressure plates 14 of a pressing device, wherein a suitable heating element 36, 36', 36" is provided in each of the individual pressure zones 7, 7', 7", by means of which the temperatures in the individual zones can be set independently of one another. The heating elements 36, 36', 36" may be located either directly in the pressure plate 13 or the counter-pressure plate 14, or in the pincer jaws of the pressing device 10 behind them.

Figure 19:
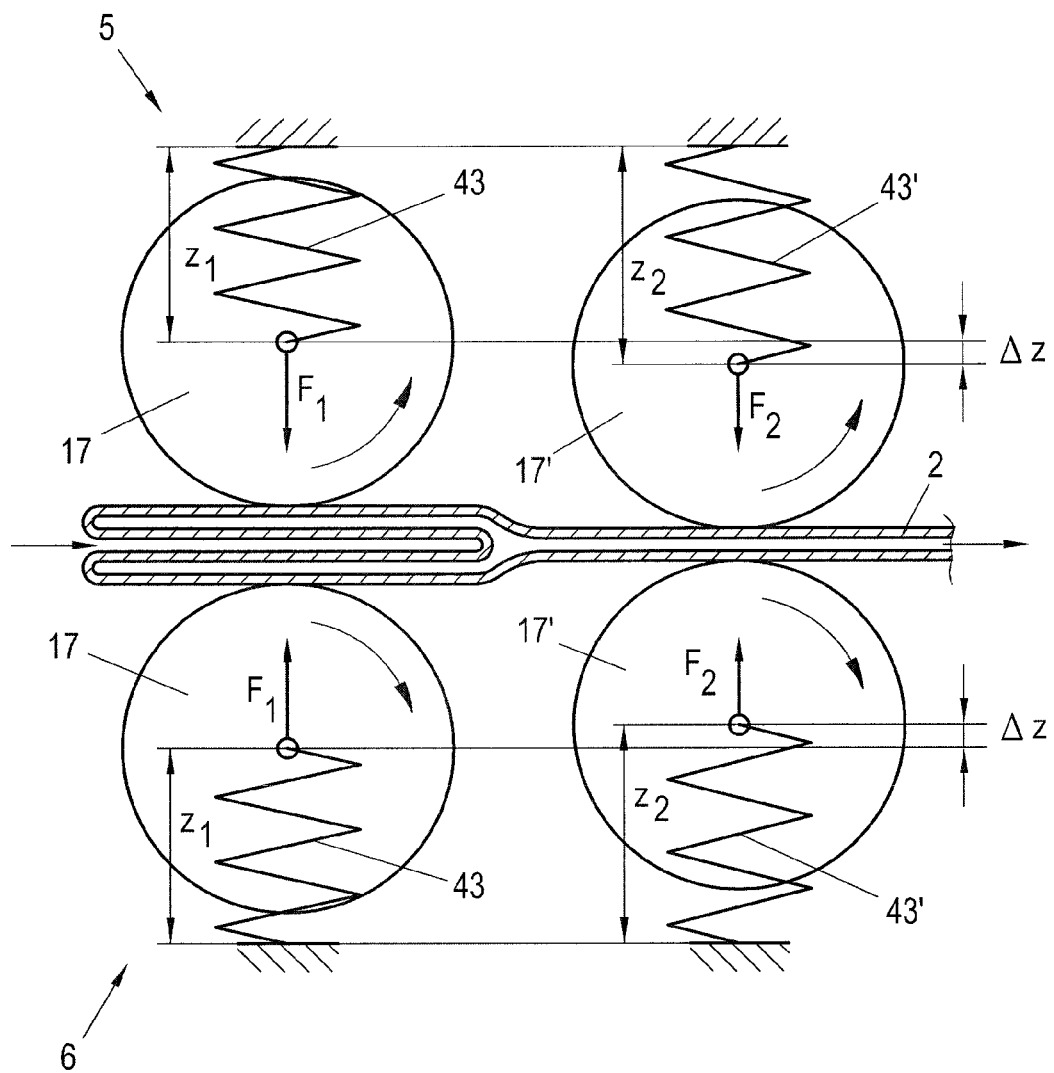
FIG. 19 schematically shows a top view of a detail of the pressing device with spring-mounted rollers and with packaging located between them.

In another embodiment of the invention, the pressure device 5 and the counter-pressure device 6, which are used for sealing the packaging units 2, are designed as pressure rollers 17 that are elastically tensioned against one another and possibly heated, having a smooth or a profiled circumferential surface, which are preloaded against one another by pressure springs 43. For sealing, the sealing regions of the packaging units 2 are passed between the pressure rollers 17 that are preloaded against one another. FIG. 19 schematically shows the method of operation of such pressure springs 17. FIG. 19 shows a top view of two pressure roller pairs 17, 17', between which a packaging unit 2 is being passed. The pressure rollers 17, which are acting on the wider region of the packaging unit 2 caused by the folded side panel 32, are pressed further apart due to the greater material thickness than the pressure rollers 17', which are acting on the narrower region. As a result, the spring excursion ($z_1$, $z_2$), which determines the contact force ($F_1$, $F_2$), also exhibits a difference ($\Delta z$) as a function of the position of the pressure rollers 17, 17' in accordance with the thickness of the material located between them.

The different pressure zones result, therefore, because of the material layers having different thicknesses, wherein a thicker material layer produces a higher spring force. Since this thickness difference is typically only 1 to 2 mm or less, pressure springs 43, 43' have to be chosen for the pressure rollers 17, 17' that, because of their spring characteristic, produce the appropriate pressure changes even for these small alterations $\Delta z$ in the spring excursion. The relationship between the preloading of the pressure springs 43, 43' and the difference in the contact pressure between thick and thin material regions can be influenced by the selection of a spring with a suitable spring characteristic (for example, linear characteristic: equal distance with altered preloading; progressive characteristic: difference increases with increasing preloading; degressive characteristic: difference decreases with increasing preloading; or discontinuous characteristic).

In order to permit more complex adjustments, the different pressure adjustments could also be controlled through a link motion that is matched to the packaging units 2 passing by. The pressing time can be regulated through the speed of the packaging units 2 or the rotational speed of the pressure rollers 17, 17'.

As an example of a roller with a profiled surface, FIG. 13 schematically shows a roller pair 17a with a corrugated circumferential surface for producing a profiled package surface in the sealing region. In order to prevent the formation of an excessively sharp-edged transition at the bottom edge of the processed surface, which could tear the package, the pressure roller 17a' can be conically tapered in the bottom region as shown in FIG. 14. FIG. 15 shows a cross-sectional view along line XV-XV from FIG. 14, in which can be seen the different corrugation depths in the top and bottom roller regions.

Figure 16:
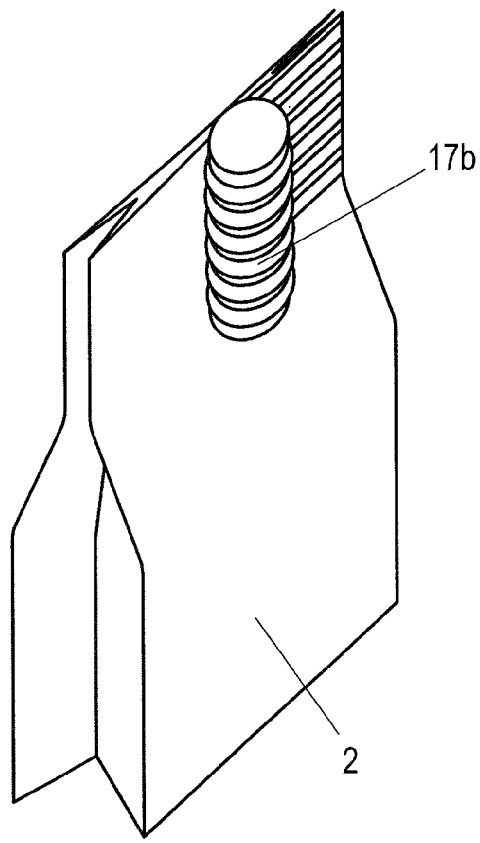
FIG. 16 shows a schematic representation of a spring-mounted roller pair with a profiled circumferential surface for producing longitudinal pressed grooves.
Figure 17:
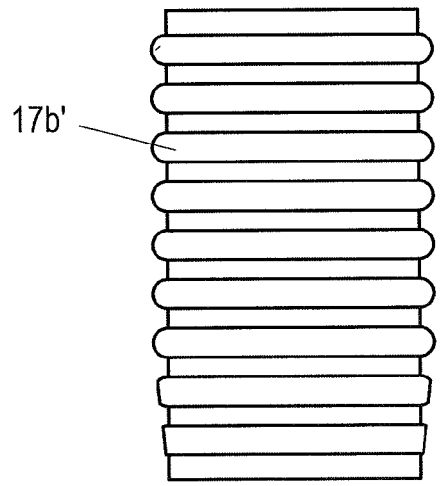
FIG. 17 shows a side view of the roller from FIG. 16.

FIG. 16 shows an additional pair of pressure rollers 17b with a profiled circumferential surface for producing longitudinal pressed grooves. These rollers can also be designed with a taper in the bottom region in order to avoid fold lines, as shown for the pressure roller 17b' in FIG. 17.

Figure 18:
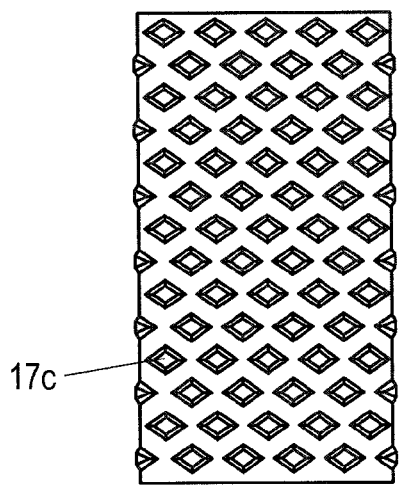
FIG. 18 shows a side view of another roller, this one provided with a honeycomb profile.

The pressure roller 17c shown in FIG. 18, which has a surface with a honeycomb-like design, is another example of a profiled circumferential surface.

Figure 12:
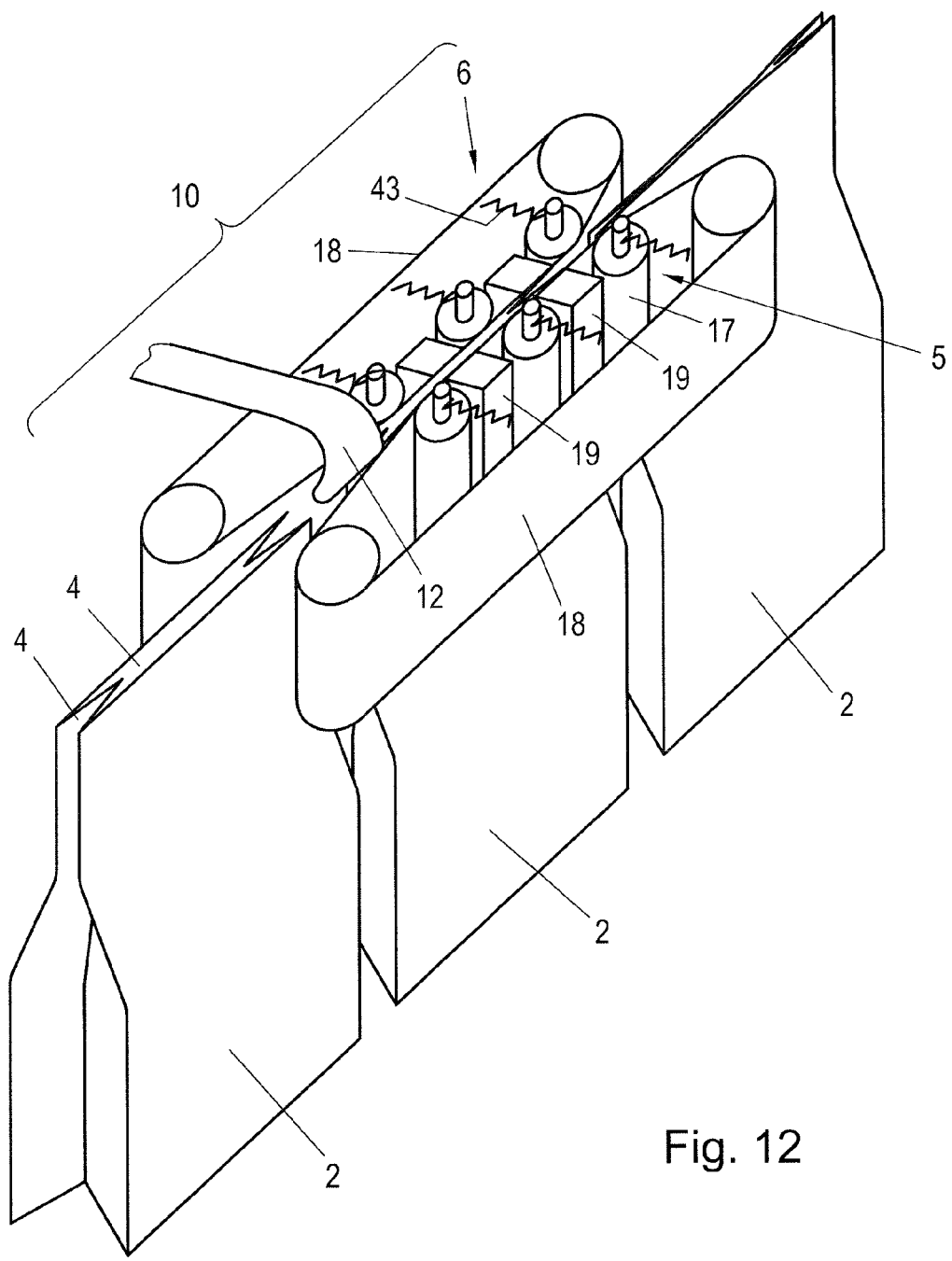
FIG. 12 shows a schematic representation of another embodiment of a pressing device with spring-mounted pressure rollers, two conveyor belts, and induction coils for heating the conveyor belt.

Another advantageous embodiment of the invention is shown in FIG. 12. In the region of the pressing device 10 in this design, the packaging units 2 are held at the height of their sealing surfaces 4 between conveyor belts 18 that are passed between the pressure device 5 and the counter-pressure device 6. The pressure device 5 and the counter-pressure device 6 are implemented as multiple pairs of pressure rollers 17, which are located behind the conveyor belts, and are preloaded against one another by means of pressure springs 43. The mode of operation is similar to that described in connection with FIG. 19, with the contact force of each pair of rollers being distributed over a wider area on account of the conveyor belts 18 than is the case for rollers that act directly on the packaging material.

In order to heat the sealing surfaces 4 pressed against one another between the conveyor belts by the pressure rollers 17, induction coils 19 may be provided before, after, or between the roller pairs, with the conveyor belts 18 containing inductively heatable metal elements. Since it is possible with the induction coils 19 to heat the conveyor belts 18 in a clearly defined region, it is possible to heat the packaging units 2 passing through in an accurately targeted way. As a result of intermittent switching, the induction coils 19 can be switched off in the free spaces between two packaging units 2, so that the conveyor belts 19 are only heated in the regions that also hold packaging units 2 between them.

Figure 10:
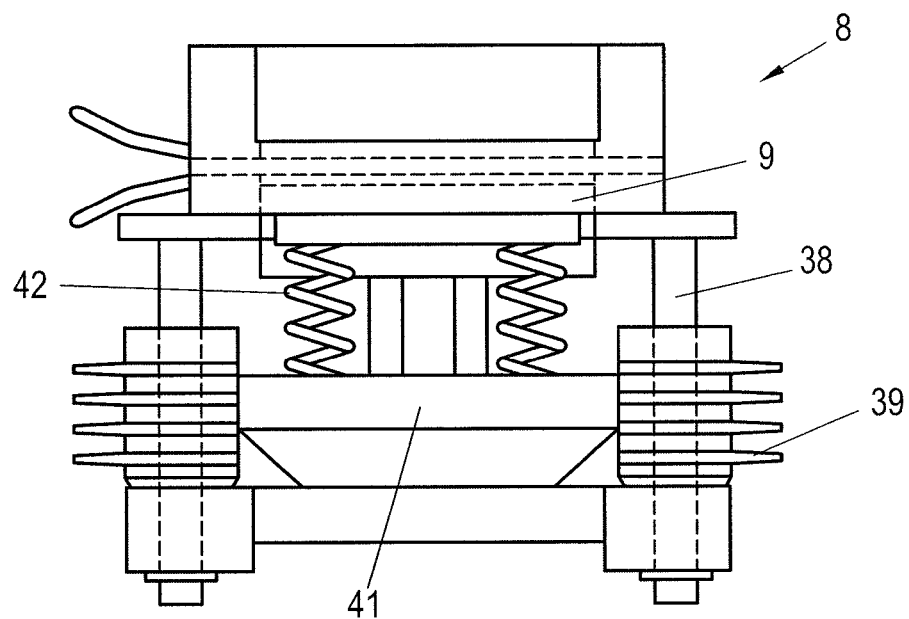
FIG. 10 shows a top view of a cooling device with integrated punch for introducing handle openings in the sealed bags.
Figure 11:
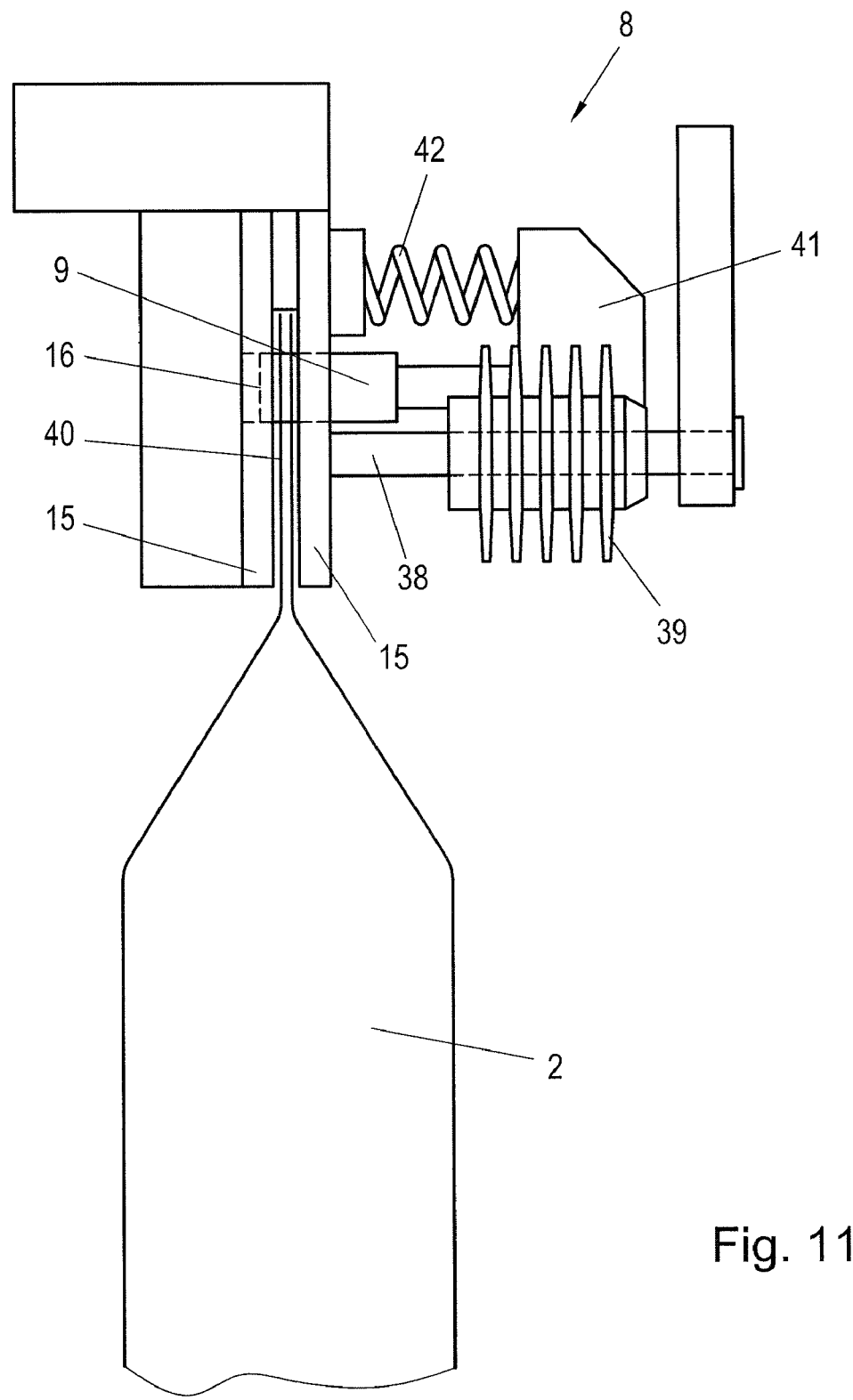
FIG. 11 shows the unit having a cooling device and punch in an end elevation.

Once the opening of the packaging unit 2 has been sealed by the pressing device 10, it is transported by the conveyor belt 21 to a cooling device 8, which is equipped with a punch 9 for introducing a handle opening 37. An exemplary cooling device 8 is shown in FIG. 10 in a top view and in FIG. 11 in an end elevation. The already sealed closure region of the packaging unit 2 is fed for punching into a guide slot 40, where the blade of the punch 9 punches a handle opening 37 in the sealed region from the side. The punch is located on a punch carriage 41, which can be moved on two guide rods 38 perpendicular to the guide slot 40 by means of a preferably hydraulic, pneumatic or electromagnetic drive that is not shown for the sake of clarity. After punching, the punch carriage 41 is returned to its initial position by two restoring springs 42. To cool the sealing surfaces 4 after pressing and heating in order to support curing, a cooler for the sealing region of the packaging unit is provided in the vicinity of the guide slot 40. For this purpose, cooling plates 15 are provided that can be placed or pressed against the packaging unit from the outside in the region of the seal, by means of which the heat can be removed from the sealing region of the package, for example by means of cooling fins 39.

The cutting edge 16 of the punch 9 is preferably discontinuous facing the top of the packaging unit 2, as is shown in the handle opening 37 illustrated in FIG. 2. In order to grip the packaging unit 2 at the handle opening 37 thus produced, the punched region is folded back at the discontinuous location so that a doubled material thickness is present in the region that is gripped by the hand (grip region), which increases the stability of the grip region. Since the fingers of the carrying hand grip the handle opening 37 only at the folded location, cuts that could be inflicted at the sharp cut edges are avoided, and carrying comfort is improved by the improved pressure distribution since the grip does not press into the hand as sharply.

In another variant embodiment that is not shown, the activation of the adhesive could be accomplished by an ultrasonic generator or microwave generator. For this purpose, the closing unit is then placed in a radiation-shielded housing so as not to endanger operating personnel. Pressing is then accomplished by means of rollers or plates.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A closing apparatus for closing bag-type packaging units by compression, which units have regions of differing thickness along a package opening to be closed, the package being made of coated or uncoated paper, paperboard, plastic, film, and/or woven material, which packaging units have at least one suitable sealing surface that is integrated in or applied to the material for permanent bonding to a surface that is adjacent to or opposite and pressed against the material, the closing apparatus comprising:
    a pressing device;
    at least one pressure device;
    at least one counter-pressure device between which the packaging units are compressed, with the application of heat, in the region of their sealing surface(s),
    wherein the pressure device and the counter-pressure device are designed as pressure rollers that are elastically tensioned against one another and heated, which have, along the package opening to be closed, zones of different pressure that depend on a thickness of a material layer.

2. The closing apparatus according to claim 1, wherein the pressure rollers that are elastically tensioned against one another have a smooth or a profiled circumferential surface.

3. The closing apparatus according to claim 2, wherein the pressure rollers have a profiled circumferential surface that includes one or more longitudinal, transverse, or diagonal corrugation(s).

4. The closing apparatus according to claim 1, wherein the closing apparatus is integrated in a cooling device and has a punch for introducing a handle opening in the packaging unit.

5. The closing apparatus according to claim 4, wherein the punch has one or more cutting edges, at least one of which being discontinuous facing the top of the packaging unit.

6. The closing apparatus according to claim 1, wherein the closing apparatus has located ahead of the pressing device, a device for trimming a top container edge, which is provided with a suction device.

7. The closing apparatus according to claim 1, wherein a hot-melt adhesive is applied to the sealing surfaces of the packaging units.

8. The closing apparatus according to claim 1, wherein pressure and/or temperature sensors are provided on the pressure device and/or the counter-pressure device and/or in the cooling device.

9. The closing apparatus according to claim 1, wherein, in the closing apparatus, the packaging units are held at a height of their sealing surfaces between conveyor belts that are passed between the pressure device and the counter-pressure device, wherein the conveyor belts contain inductively heatable metal elements, and wherein one or more induction coil(s) are provided in the region of the pressing device in order to heat the conveyor belt.

10. A closing apparatus for closing bag-type packaging units by compression, which units have regions of differing thickness along a package opening to be closed, the package being made of coated or uncoated paper, paperboard, plastic, film, and/or woven material, which packaging units have at least one suitable sealing surface that is integrated in or applied to the material for permanent bonding to a surface that is adjacent to or opposite and pressed against the material, the closing apparatus comprising:

a pressing device;

at least one pressure device; and at least one counter-pressure device between which the packaging units are compressed in a region of their sealing surface(s), wherein the pressure device and the counter-pressure device are designed as pressure rollers that are elastically tensioned against one another and that have, along the package opening to be closed, zones of different pressure that depend on a thickness of a material layer.

11. The closing apparatus according to claim 10, wherein the packaging units are compressed between the at least one counter-pressure device with the application of heat.

12. The closing apparatus according to claim 10, wherein the pressure device and/or the counter-pressure device are heated.

13. A closing apparatus for closing bag-type packaging units by compression, which units have regions of differing thickness along a package opening to be closed and at least one suitable sealing surface that is integrated in or applied to the units for permanent bonding to an adjacent or opposite surface, the closing apparatus comprising:

a pressing device comprising at least one pressure device and at least one counter-pressure device for compressing the packaging units in a region of their at least one sealing surface, wherein the pressure device comprises a first plurality of pressure rollers mounted to a first support and elastically biased in a first direction with a force that depends on the position of the first plurality of pressure rollers relative to the first support and a second plurality of pressure rollers mounted to a second support and biased in a second direction opposite the first direction.

14. The closing apparatus according to claim 13, wherein the second plurality of pressure rollers are elastically biased in the second direction with a force that depends on the position of the second plurality of pressure rollers relative to the second support.

15. The closing apparatus according to claim 14, including a first plurality of springs for biasing the first plurality of rollers in the first direction and a second plurality of springs for biasing the second plurality of rollers in the second direction.

16. The closing apparatus according to claim 15, wherein the first plurality of pressure rollers and the second plurality of pressure rollers comprise heated rollers.

17. The closing apparatus according to claim 13, wherein the first plurality of pressure rollers comprise heated pressure rollers.

\* \* \* \* \*